United States Patent
Osann, Jr.

(10) Patent No.: US 9,268,054 B2
(45) Date of Patent: Feb. 23, 2016

(54) SYNCHRONIZED ROBOTIC BAGGAGE PORTAL FOR SECURE ACCESS

(76) Inventor: Robert Osann, Jr., Port Angeles, WA (US)

( * ) Notice: Subject to any disclaimer, the term of this patent is extended or adjusted under 35 U.S.C. 154(b) by 0 days.

(21) Appl. No.: 13/541,732

(22) Filed: Jul. 4, 2012

(65) Prior Publication Data
US 2013/0009747 A1    Jan. 10, 2013

Related U.S. Application Data

(60) Provisional application No. 61/505,510, filed on Jul. 7, 2011.

(51) Int. Cl.
*G05B 19/00* (2006.01)
*G01V 5/00* (2006.01)

(52) U.S. Cl.
CPC ................... *G01V 5/0008* (2013.01)

(58) Field of Classification Search
CPC ....................................................... G08B 13/00
USPC ...................................... 340/5.1, 5.2, 5.3, 5.7
See application file for complete search history.

(56) References Cited

U.S. PATENT DOCUMENTS

| | | | |
|---|---|---|---|
| 4,586,441 A | 5/1986 | Zekich | |
| 5,793,639 A * | 8/1998 | Yamazaki .............. | B64F 1/366 235/375 |
| 5,919,239 A * | 7/1999 | Fraker et al. .................. | 701/473 |
| 5,990,422 A * | 11/1999 | Komori ............... | G01G 19/035 177/119 |
| 6,507,278 B1 * | 1/2003 | Brunetti .................. | B64F 1/366 340/5.3 |
| 6,732,849 B2 * | 5/2004 | Yamamoto ............. | B65G 17/16 198/370.03 |
| 8,100,084 B1 * | 1/2012 | Abramson ................. | 119/51.02 |
| 2002/0035515 A1 * | 3/2002 | Moreno ............... | A47G 29/141 340/5.73 |
| 2004/0017929 A1 * | 1/2004 | Bramblet et al. ............ | 382/103 |
| 2005/0057354 A1 * | 3/2005 | Jenkins ................... | G01V 11/00 340/522 |
| 2007/0211922 A1 | 9/2007 | Crowley et al. | |
| 2007/0235658 A1 * | 10/2007 | Zimdars .................... | G01J 3/42 250/390.07 |
| 2008/0292050 A1 * | 11/2008 | Goodenough ......... | G01V 5/005 378/57 |
| 2009/0072979 A1 * | 3/2009 | Yamaguchi ............ | G01R 33/02 340/573.1 |
| 2009/0304230 A1 * | 12/2009 | Krahnstoever et al. ....... | 382/103 |
| 2010/0063607 A1 * | 3/2010 | Neale et al. ..................... | 700/91 |
| 2010/0158191 A1 * | 6/2010 | Gray .................... | G01V 5/0008 378/57 |

FOREIGN PATENT DOCUMENTS

EP        2390845          11/2011
FR    WO1987/002005       4/1987

* cited by examiner

*Primary Examiner* — Hai Phan
*Assistant Examiner* — Zhen Y Wu

(57) ABSTRACT

Systems and methods describe automated/robotic baggage portals as well as their use when synchronized with automated/robotic human security portals. When companion human and baggage portals are synchronized, baggage items belonging to a subject are not passed through to a secure area unless the subject is cleared by a companion human portal for passage. Likewise, unless the subject is cleared for passage by the human portal, baggage items belonging to the subject are not passed through to a secure area unless the subject is cleared by the companion human portal. Variations on synchronization, tracking, and coordination mechanisms and methods are described as well as variations on baggage portal mechanisms including conveyer arrangements and baggage chamber configurations.

2 Claims, 12 Drawing Sheets

Baggage security portal synchronized with companion human security portal

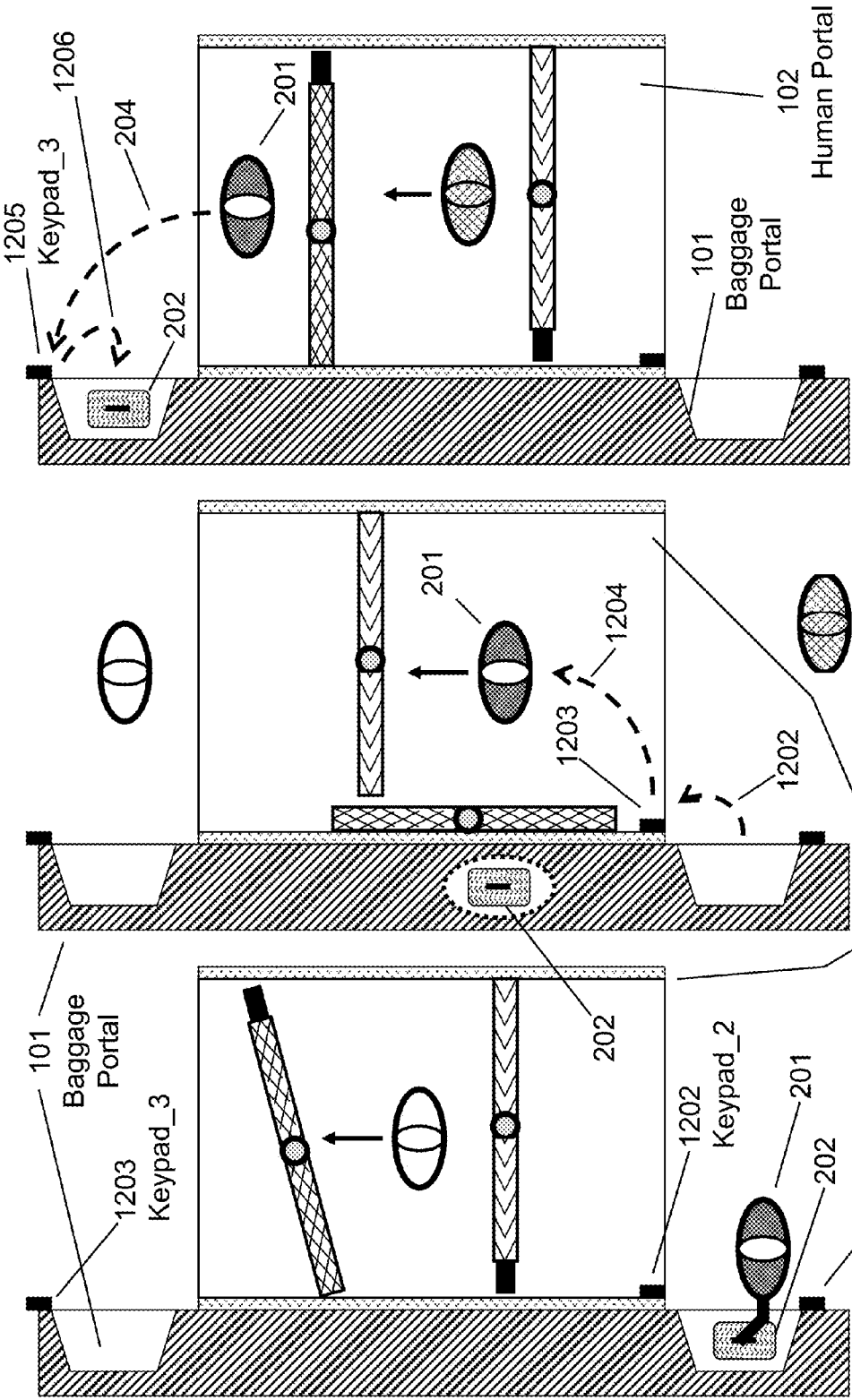

SYNCHRONIZED ROBOTIC BAGGAGE PORTAL FOR SECURE ACCESS

CLAIM OF PRIORITY

This application claims the benefit and priority of U.S. Provisional Application Ser. No. 61/505,510, filed on Jul. 7, 2011, and entitled "Robotic Baggage Portal for Secure Access" by inventor Robert Osann, Jr., commonly assigned with the present application and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to access control devices that control the passage of baggage or personal items in such a way as to provide a more secure access path to a building, premises, or secured area. Heretofore such devices include those known as baggage scanners and security checkpoints. The invention also relates to human portals that detect and/or prevent persons from passing into a secure area when they are determined to be a threat, and to human portals used in conjunction with baggage portals.

BACKGROUND

A wide variety of security access control devices exist today which attempt to control access to secure areas. Security checkpoints at airports include metal detection and various forms of x-ray and scanning capability. However, if a person carrying a weapon was determined to pass through such a security checkpoint while knowing they would be instantly detected, they could do so, and until they were apprehended they could use their weapon within the airport. Metal detectors at the entrance to banks will warn if someone carries a gun into a bank, however it will not stop them from doing so.

Many security systems combine identification mechanisms such as cards, fingerprints, RFID, or optical scan of retina or facial features in order to identify an individual and allow them access. Unfortunately, the perpetrator of the crime is sometimes one normally allowed access to a facility or area, and use of an identification card will not hinder them. In the case of gathering places such as lecture halls at universities, schools in general, sporting events, airports, secure office buildings, and large business facilities, if a person with suicidal and/or murderous tendencies is determined to wreak havoc and destruction upon a large number of people, today's security access devices will not prevent them from entering if they are carrying a weapon and intend to use it.

Therefore, new security access control devices are needed that will not only detect a person carrying a weapon and attempting to pass through a security access point or portal, but will absolutely prevent that person and their baggage from passing if a decision is made to prevent them—that decision preferably being made automatically. When it is impractical to scan a person's baggage as they carry it with them through a human security portal, that baggage may be scanned separately. If an access control point utilizes robotic human portals that may operate unattended, it is therefore useful to have robotic baggage portals that operate unattended. To maximize security, when an automatic human portal detects that a person is a threat, that person's baggage should also be prevented from passing. Likewise, when a robotic or automatic baggage portal detects that an article of baggage represents a threat and prevents that article from passing, the person who placed that baggage into the baggage portal should also be prevented from passing.

SUMMARY

The invention described herein is a system including an electro-mechanical and electronically controlled baggage security portal or screening device for controlling the passage of an article or articles of baggage into a building, premises, or area in a secure manner such that an item that is deemed ineligible for access will be stopped and barred entry and may be optionally retained. The direction of flow through a device according to this invention is electronically controlled and may be changed at any point in time. At any instant in time, the flow through the device is unidirectional. Baggage that is denied passage may be automatically transported in a reverse direction or alternately retained for further inspection. Similarly, a companion robotic/automatic human portal may stop a human subject from passing if a threat is detected, and in addition may optionally retain the subject for further screening. An example of such a robotic/automatic human portal which may be synchronized with an automatic/robotic baggage portal according to the present invention is shown in co-pending U.S. patent application Ser. No. 12/502,997 and co-pending British patent application S/N GB2474205A.

In close proximity to an automatic/robotic human portal, there may be a conveyor mechanism or baggage portal to move and scan luggage/baggage of any type that the subject passing through the human portal is transporting, and for which it is not desirable for the baggage to pass through the human portal along with the human subject. For instance, it may be more reliable or effective to scan the baggage separately. To accommodate the baggage and enable the subject to move the baggage into the secure area in the most effective manner and with a maximum probability of detection, the baggage must be cleared and allowed to pass only if the subject is cleared and allowed to pass, and the subject is cleared and allowed to pass only if the baggage is cleared and allowed to pass. Thus the baggage portal is synchronized with the human portal, and the need for intervention by additional security personnel is minimized, allowing such synchronized portals to operate relatively unattended and to also handle a relatively high traffic throughput rate. If either of the companion human and baggage portals detects a suspected threat, the subject and/or their baggage may be either seized or gracefully backed-out of the companion portals together.

One object of this invention is that an automatic baggage portal according to this invention may be optionally synchronized with a companion human security portal, and may include some combination of the following functionalities:
1) both baggage and human portals are capable of unattended operation;
2) item(s) of baggage are linked to a subject entering the companion human portal (to which the baggage portal is synchronized) by a linking or synchronization control mechanism—for example an imaging system with image processing software wherein the imaging system is used by a portal control system for the baggage and human portals to track movements of a subject and their baggage;

3) if an item of baggage is deemed ineligible for passage, the companion subject (the person responsible for or related to the baggage) is also denied passage through the companion human portal;

4) if a human subject is deemed ineligible for passage through the companion human portal, their companion item(s) of baggage are also denied passage through the companion baggage portal; and 5) baggage items are not released into the secure area unless the subject has physically passed through the human portal into the secure area.

An alternative and exemplary synchronization mechanism includes the user entering a brief key code on a keypad when they place their baggage in the portal and then they enter the same code when entering the human portal to signify they are the owner of the specific baggage. Then, both baggage and the subject/owner must pass the security screening in both portals for either to pass through successfully, and the baggage is subsequently retrieved at the portal exit when the user again enters the same code.

Personal identification mechanisms other than a key code may alternately be utilized to connect a responsible person with their baggage. For example, fingerprint identification may be used or any other form of personal ID known in the art such as retina scan or facial characteristics.

It is also an object of the invention to prevent a subject from sending an item of baggage containing a weapon through the baggage portal, clearing themselves through the companion human portal, and then not completing their passage through the human portal. This scenario could result in a weapon being left in the secured area, while the subject escapes through the non-secure area outside the portal. Therefore, an optional requirement of the invention is to require that a subject completely pass through the human portal before their baggage is passed through.

Should an operational exception happen during operation of the companion human and baggage portals according to the invention, an alarm should optionally summon the appropriate authorities.

Another object of this invention is that multiple access control devices such as those described herein may be stacked side-by side to allow for greater throughput. When this is done, some human portals may have baggage portals adjacent to them and some may not be associated with a baggage portal since not all persons traveling through a human portal will be carrying baggage. A baggage portal may be located between two human portals and essentially be shared between the two. Alternately, a baggage portal may be strictly associated with a single human portal. A dual baggage portal may be provided to service two human portals, or alternately to service a single human portal if additional throughput is desired.

The baggage portal may be a conveyor mechanism or a form of sliding drawer, but should have some form of dividing barrier ahead of and behind the baggage corresponding to a specific subject such that there is never a clear path through the baggage portal from input to output at any time. This prevents unauthorized weapon passing and the same restriction should be applied to any human portal that is used as a companion portal with a baggage portal described herein. It may be additionally desirable for these dividing barriers to form relatively air-tight seals around the baggage as the baggage is moved through the baggage portal such that an explosive, chemical, or bio sniffing sensor has a maximum ability to detect trace vapors being out-gassed from the baggage being tested, since the smaller air space would intensify the vapor concentration. To better facilitate a reduction in the size of the space being occupied by the baggage during this vapor sensing operation, some of the walls (any combination of the 6 walls surrounding the baggage) may be moved under computer control to form a chamber of minimum size to enclose the baggage once the baggage has been released by the subject to begin its travel through the baggage portal. Sensors (proximity and/or tactile) are used to prevent and protect the baggage from damage. To accelerate vaporization of trace explosives, a light and/or heat emitting mechanism may flash once the baggage is sealed within the baggage portal, or alternately the surface of the baggage may be lit with a laser for this purpose. Heat may also be applied along with a controlled air flow.

A variety of threat sensors may be included in a baggage portal according to the subject invention, implemented with technologies that may include but are not limited to metal detectors; chemical, explosive, biological, and radiological sensors; scanning technologies including x-ray imaging, backscatter x-ray imaging, penetrating (UWB) radar imaging, and millimeter wave imaging; and laser based scanning technologies that scan the surface of the baggage. Such sensors and associated sensor-related components are well known in the art and may be incorporated into any components of the structure comprising the baggage portal mechanism including the side walls, floor, ceiling, and any surfaces of any moving dividers or panels.

It is also useful for the baggage portal to include a mechanism to help each subject control their baggage and prevent another person from adding an object in with their baggage, taking their baggage, or otherwise tampering with or having access to their baggage. Thus, after a subject inserts their baggage into the input bin of the baggage portal, they may cause a cover to seal the portal so as they walk over to a companion human portal (and take their eyes off the baggage portal), the baggage portal is sealed so they don't have to worry about others having access to their baggage.

When a companion human portal is utilized along with a robotic baggage portal, the human portal may be any type. However, a preferred human portal for this application should be automatic and capable of fully detaining or preventing a person from passing when a threat is detected either on the person or in their baggage when that baggage is scanned by a companion baggage portal. Thus, a preferred human portal should have separate entry and exit doors and as such falls into the category commonly known as a "man trap" portal, or alternately be an automatic LRD portal or Linear Revolving Door as described in co-pending U.S. patent application Ser. No. 12/502,997 and co-pending British patent application S/N GB2474205A.

BRIEF DESCRIPTION OF THE DRAWINGS

FIG. 12 shows an alternate embodiment for a baggage portal which operates in a synchronized manner with a companion human portal, in this example tracking a connection between baggage items and baggage owner by way of a personal identification mechanism.

DETAILED DESCRIPTION OF THE INVENTION

Figure 1:
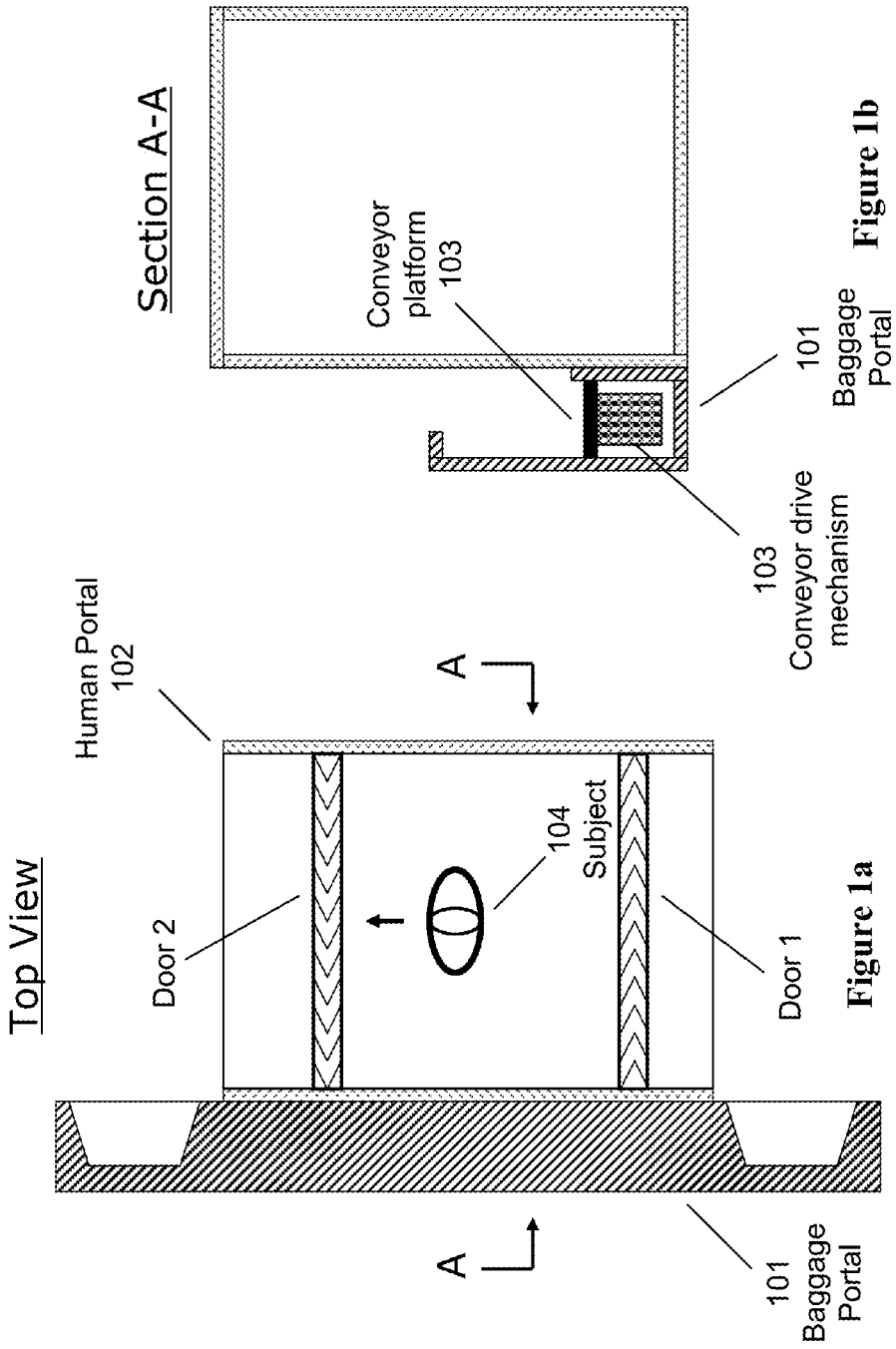
FIG. 1 shows an exemplary and non-limiting robotic baggage portal according to the invention used in conjunction with and synchronized with a companion robotic human portal.

FIG. 1 shows an exemplary and non-limiting robotic baggage portal 101 according to the invention used in conjunction with a companion robotic human portal 102 shown adjacent each other in the top view of FIG. 1a. FIG. 1b shows cross section A-A indicating a conveyor-type platform 103 may be used to move baggage belonging to or related to a subject 104 through baggage portal 101.

Figure 2:
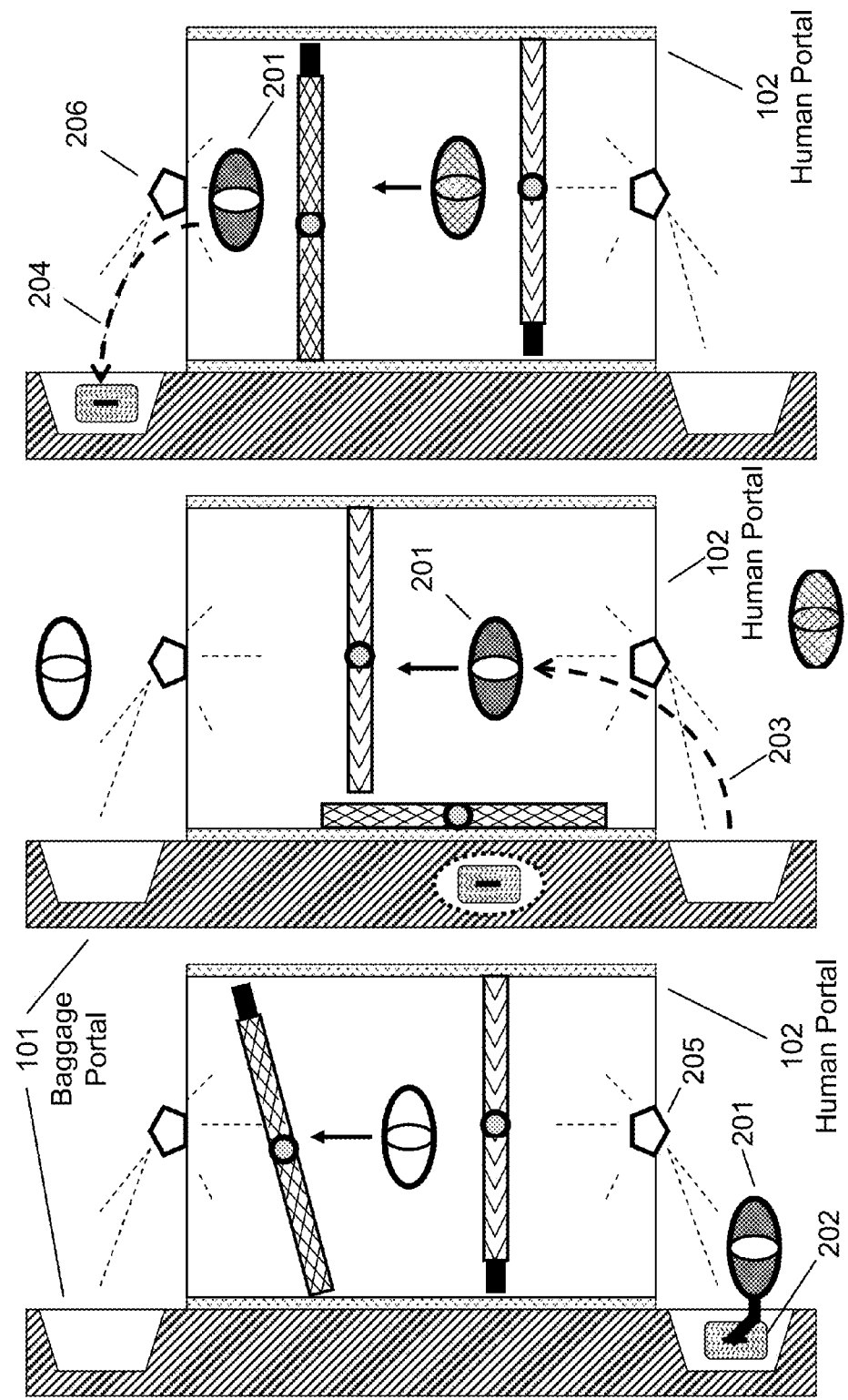
FIG. 2 shows an exemplary robotic baggage portal and companion robotic human portal where the two are synchronized using an optical tracking and coordination control mechanism.

FIG. 2 shows an exemplary baggage portal 101 and companion human portal 102 where the two are synchronized such that a subject 201 and their baggage 202 will both be stopped or detained if either is detected to represent a threat. To coordinate/correlate articles of baggage with a particular subject, an imaging mechanism is used in the example of FIG. 2 to observe the movements of the subject (and any other persons in the vicinity) as the subject:

1) places their baggage into baggage portal 101 as shown in FIG. 2a;
2) walks 203 into the human portal as shown in FIG. 2b; and
3) exits 204 the human portal and retrieves their baggage as shown in FIG. 2c.

When baggage is placed in the baggage portal as shown in FIG. 2a, an imaging system with imaging sensor 205, located at the entrance side in an unsecure area, notices the connection/proximity between the subject person and their baggage, making the conclusion or inference that the particular baggage items are related to the subject due to their close proximity to the subject. Imaging sensor 205 then monitors the subject's movements as they enter the human portal in FIG. 2b. As the subject exits the portal as shown in FIG. 2c, imaging sensor 206 on the exit side of the portal notices the subject and tracks their movement as they move towards the exit of the baggage portal. The imaging system then takes note of the person's movements as they are reunited with their baggage and allows the subject to extract their baggage from the baggage portal. Note that while only one imaging sensor is shown at each of the input and output of the portals in FIG. 2, multiple imaging sensors may be used at both input and output. One purpose of the imaging system is to ensure that the baggage a person placed in the portal is reunited successfully with that person. Another purpose of the imaging system is to ensure that other persons do not take possession of or tamper with the baggage in an unauthorized manner, whereby an alarm and/or notification of the authorities would result. If for instance a guard or other authorized person was to assist a baggage owner in placing or retrieving their baggage, an override mechanism would be available to enable this without setting off an alarm. Such a situation may arise when an elderly or disabled person needs to pass through the portal, or alternately a child accompanied by an adult. Optionally, all imaging activity can be recorded and played-back at a later time.

Figure 3:
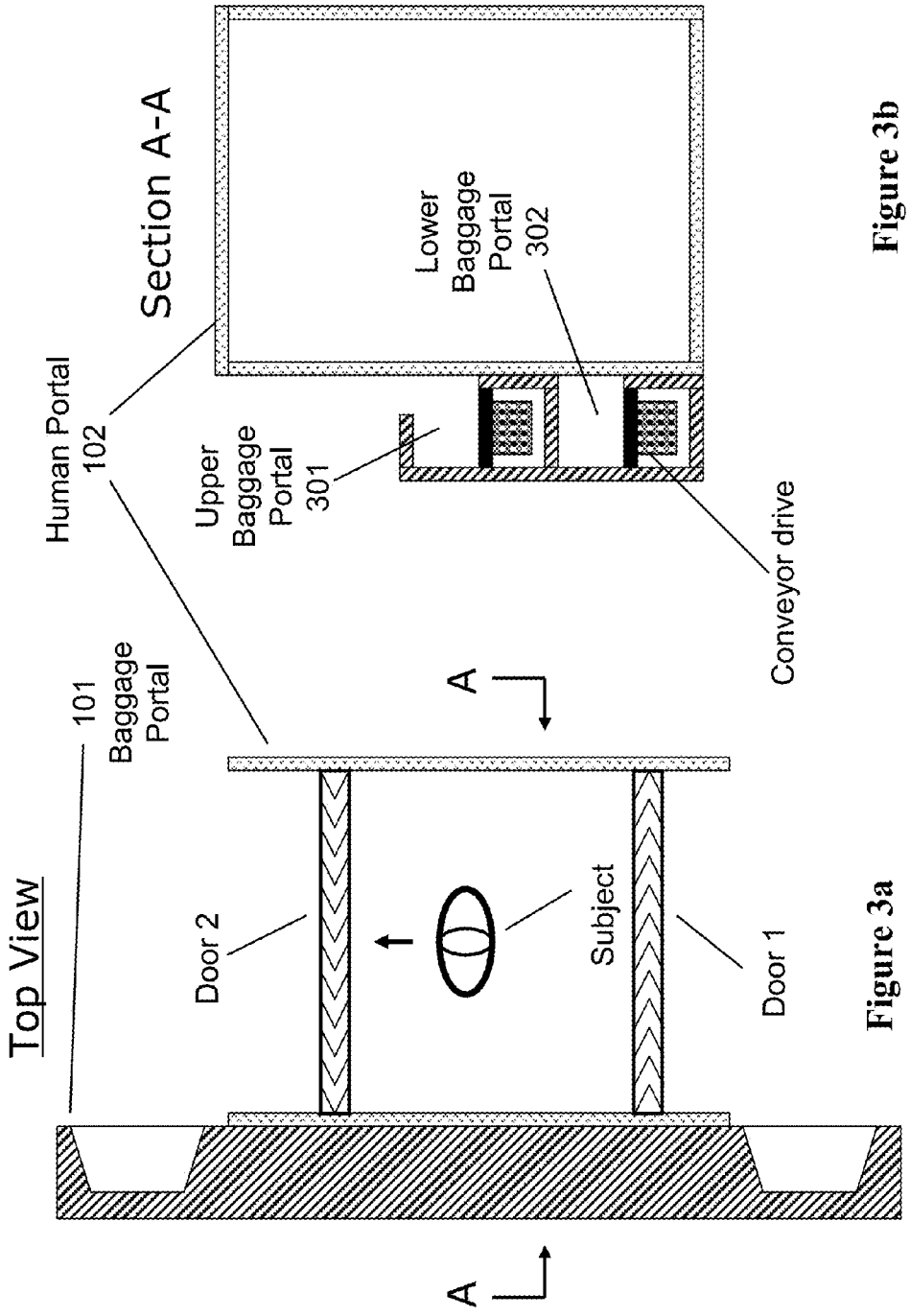
FIG. 3 shows one exemplary and non-limiting embodiment of the invention where a baggage portal with dual conveyance paths is used in conjunction with a companion human portal.

FIG. 3 shows one exemplary and non-limiting embodiment of the invention where a baggage portal with dual conveyance paths is used in conjunction with a companion human portal. In FIG. 3a, a top view shows a baggage portal 101 and human portal 102 adjacent to each other. FIG. 3b shows cross-section A-A where two baggage portal paths are shown, in this example implemented as conveyors. These include an upper portal 301 and a lower portal 302. The purpose of the dual conveyance paths in this example is to increase the rate of throughput of the baggage portal in order to support a faster rate of passage through the companion human portal. This will be explained further with regard to FIGS. 4, 5, and 6. In exemplary and non-limiting embodiments, dual baggage portals may be implemented as dual conveyers or as dual sliding compartments or drawers, to name a few possible implementations.

Figure 4:
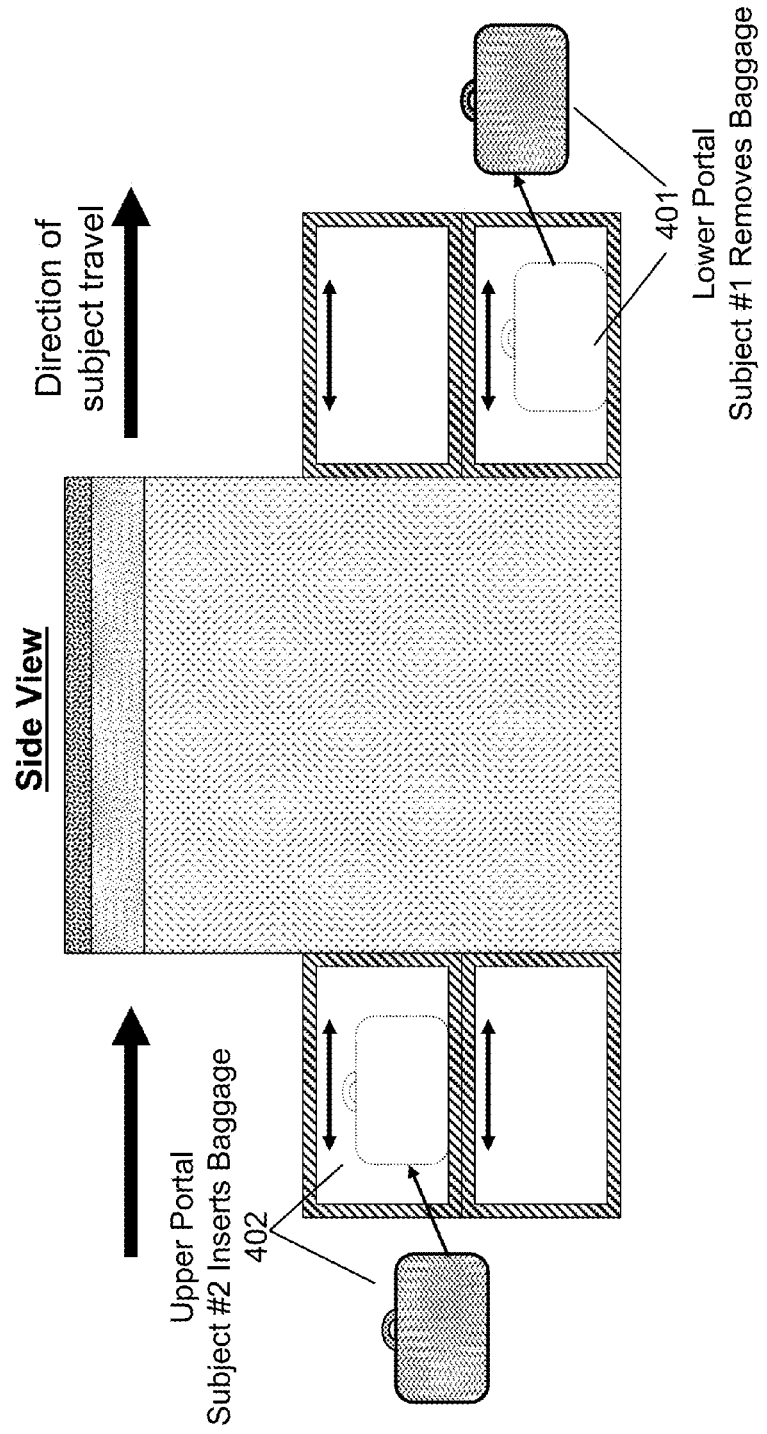
FIG. 4 shows a side, cross-sectional view of the portal combination of FIG. 3 and describes the sequence of use.

FIG. 4 shows a side and cross-sectional view of the portal combination of FIG. 3 and explains the sequence of use. According to FIG. 4, a first subject having already passed through the human portal is removing their baggage 401 from the lower portal while a second subject is simultaneously inserting their baggage 402 into the upper portal of the dual baggage portal. If a sliding tray or compartment is used to move the baggage through the baggage portal instead of a conveyer, the dual conveyance path configuration also allows one tray to be returning while another is moving in the direction of travel, thus increasing the overall throughput rate for a baggage/human portal pair.

Figure 5:
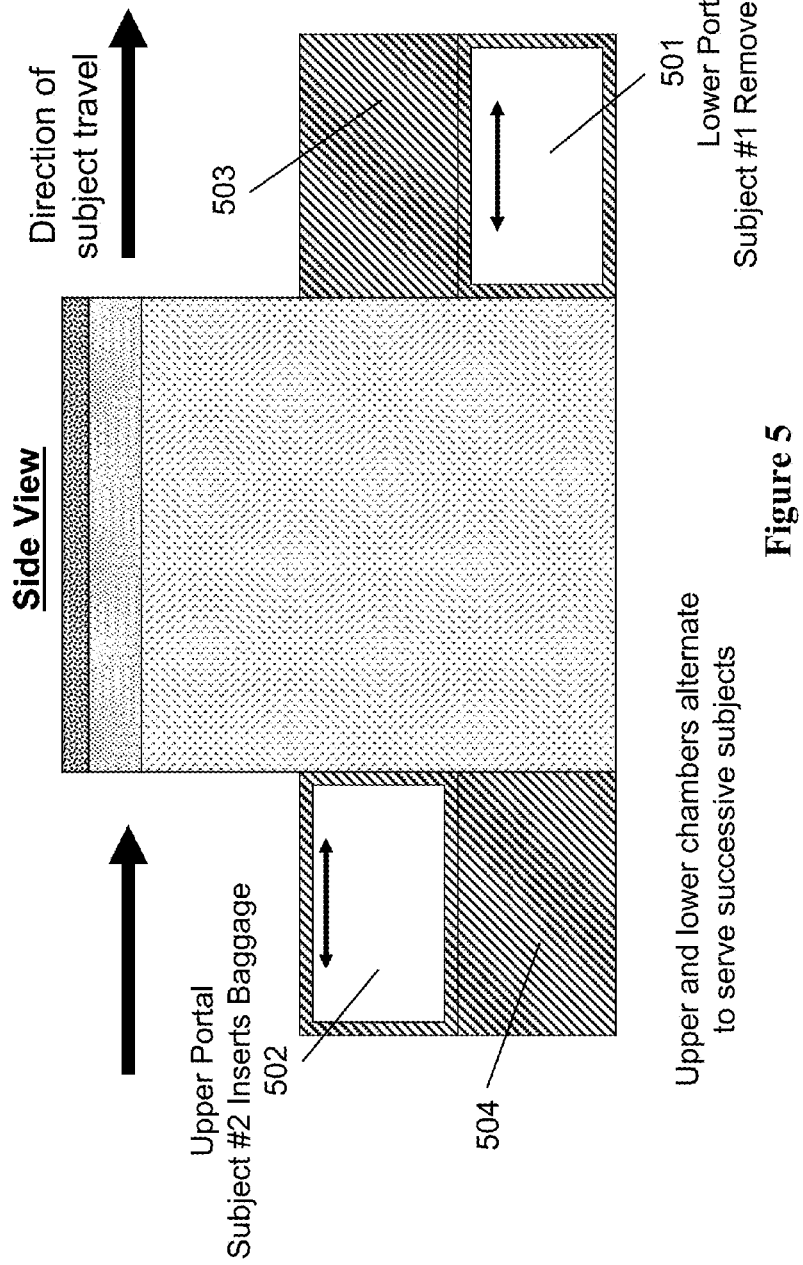
FIG. 5 shows a baggage portal such as that of FIG. 4, where some baggage access openings are open while other openings are covered.

FIG. 5 shows a baggage portal such as that of FIG. 4, except as shown in FIG. 5 some openings 501 and 502 to the baggage access areas are open while other openings 503 and 504 which are not accessible at the moment are shown covered, as they would be at times during operation according to FIGS. 3 and 4. Per FIG. 5, an access opening on a baggage portal would only be open for access when the baggage owner (or some other authorized or related person) is attempting to insert or retrieve items of baggage.

Figure 6:
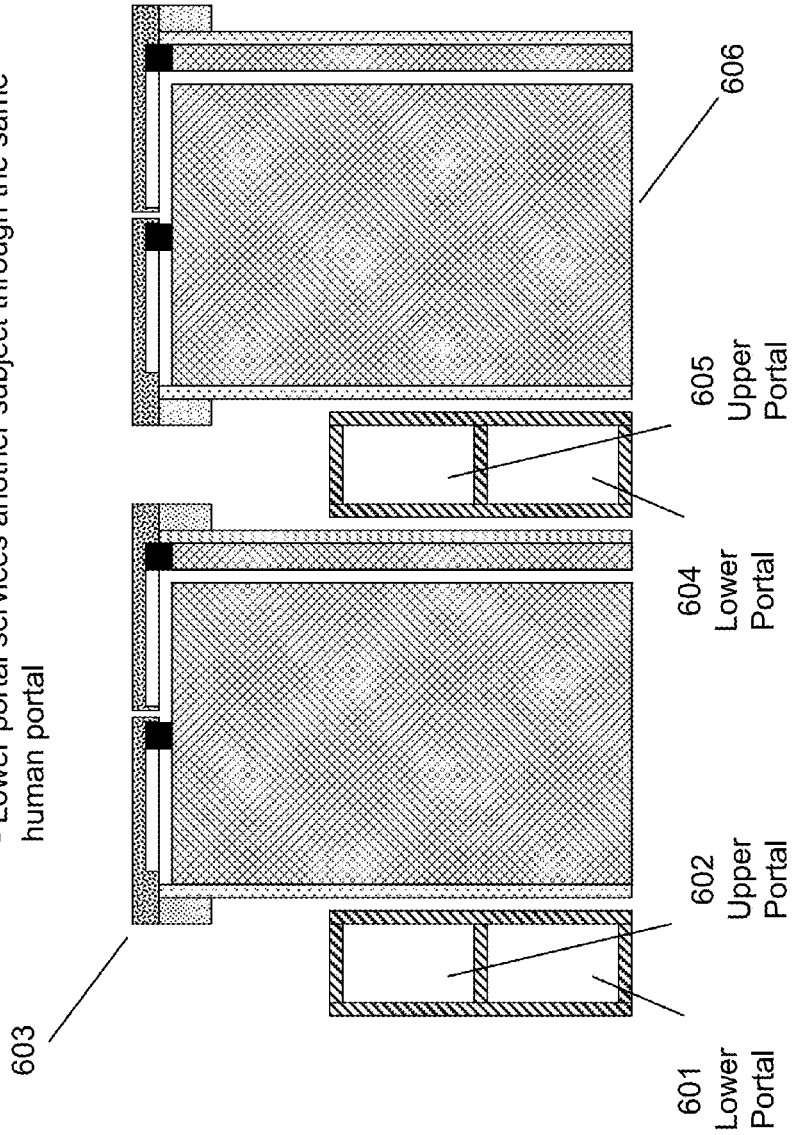
FIG. 6 shows a cross-section view of two sets of companion human/baggage portals according to FIGS. 3, 4, and 5 where each baggage portal is a dual baggage portal.

FIG. 6 shows a cross-section view of two sets of companion human/baggage portals according to FIGS. 3, 4, and 5 where each baggage portal is a dual baggage portal in order to offer fast throughput for each subject, and the portals are stacked side-by-side to offer yet more throughput. Baggage portals 601 and 602 service human subjects passing through portal 603 and Baggage portals 604 and 605 service human subjects passing through portal 606.

Figure 7:
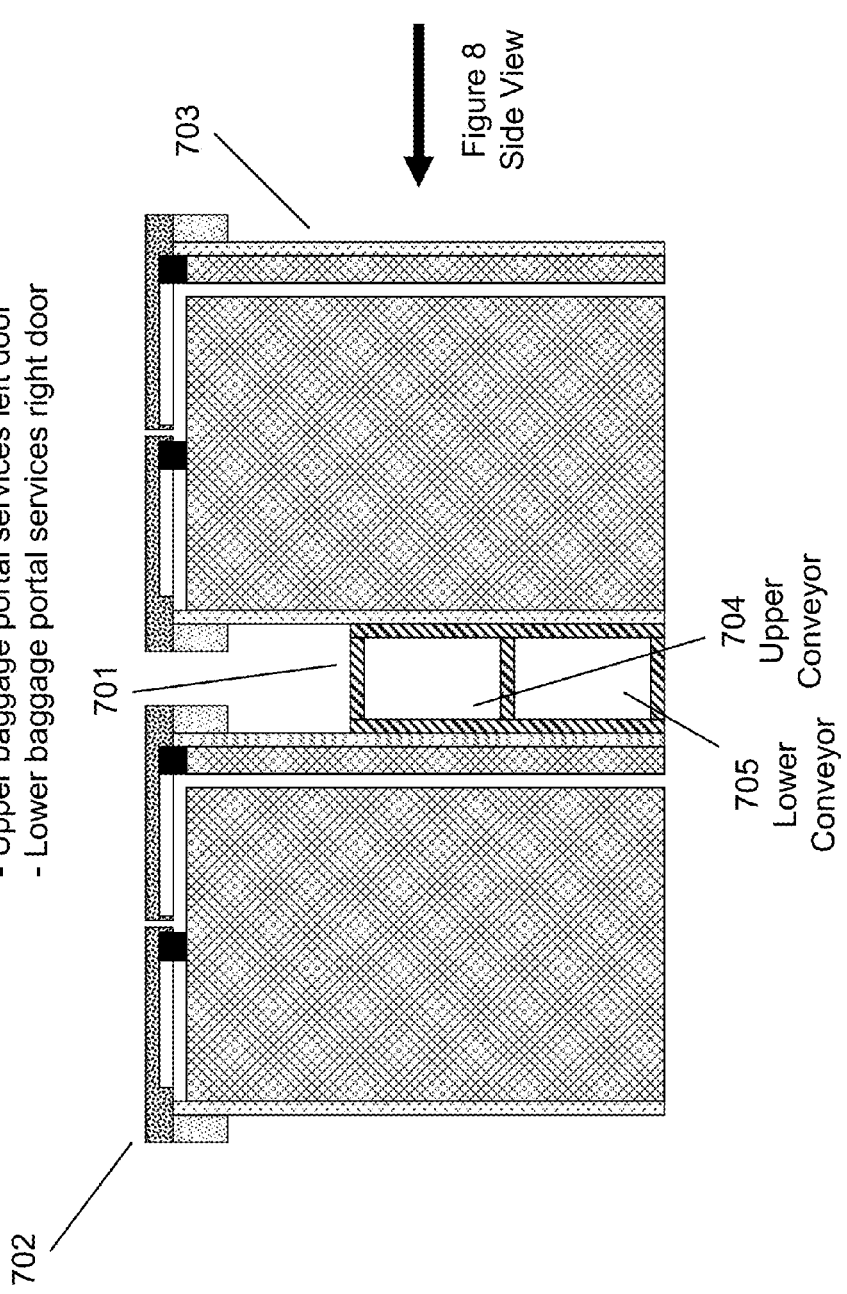
FIG. 7 shows a dual baggage portal positioned between two human portals.

FIG. 7 shows a dual baggage portal 701 positioned between two human portals, 702 and 703. A configuration such as this may be used to allow one dual baggage portal to be shared between the two human portals. To accomplish this, access doors on each side of the baggage portal may be controlled individually to allow access from either the left or right side depending on which human portal the baggage portal is servicing at the time. As such, upper conveyor 704 may service a subject passing through human portal 703, while simultaneously, lower conveyor 705 may service a subject passing through human portal 702. Alternately, through programming of the control system for these robotic portals, dual baggage portal 701 may service only one of human portals 702 and 703 in order to provide faster throughput by alternating which of 702 and 703 services each of successive subjects, while the other of 702 and 703 services only subjects with no baggage or alternately services subjects passing in the opposite direction to exit the secure area.

Figure 8:
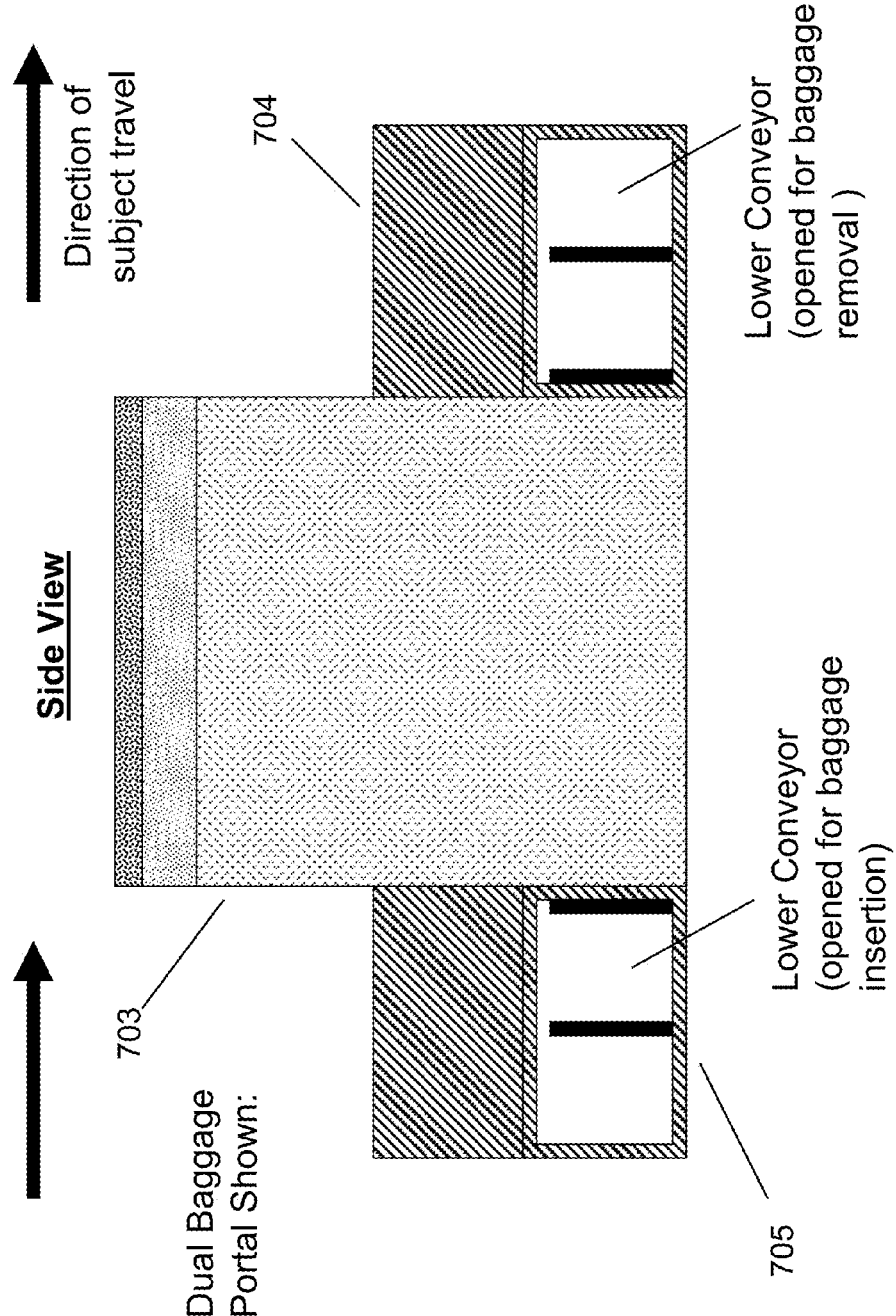
FIG. 8 shows a side view of the configuration of FIG. 7.

FIG. 8 shows a side view of the configuration of FIG. 7, in this instance the lower conveyor 705 of the dual baggage portal is servicing human portal 703 of FIG. 7.

Figure 9:
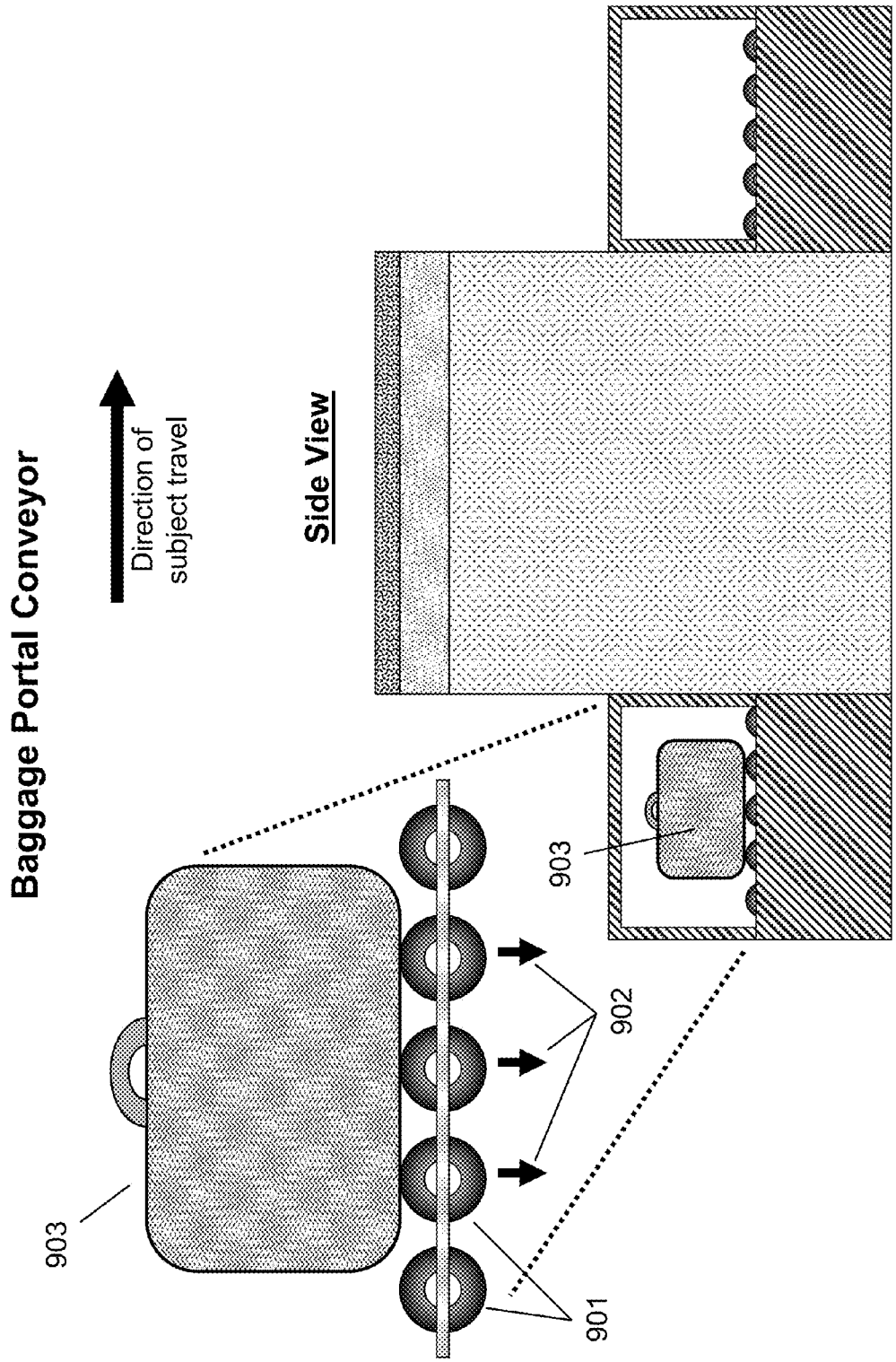
FIG. 9 shows one exemplary implementation for a baggage conveyor mechanism where a baggage portal utilizes a conveyor as opposed to a sliding tray or compartment.

FIG. 9 shows one exemplary implementation for a baggage conveyor mechanism where a baggage portal utilizes a conveyor as opposed to a sliding tray or compartment. In this case each of rollers 901 of the conveyor mechanism is operated independently with its own drive mechanism and also has the ability to sense weight 902 placed on it by a baggage item 903 such that the mass and size of a piece of baggage and position of the baggage is determined by a controller mechanism that controls the baggage portal. When adjacent rollers detect weight, it can be assumed that they are both supporting a baggage item or items. Where one roller detects weight and an adjacent roller does not, it can be assumed that the edge of a baggage item lies between them. Such information is especially useful if a variable size baggage chamber is utilized per FIGS. 10 and 11.

Figure 10:
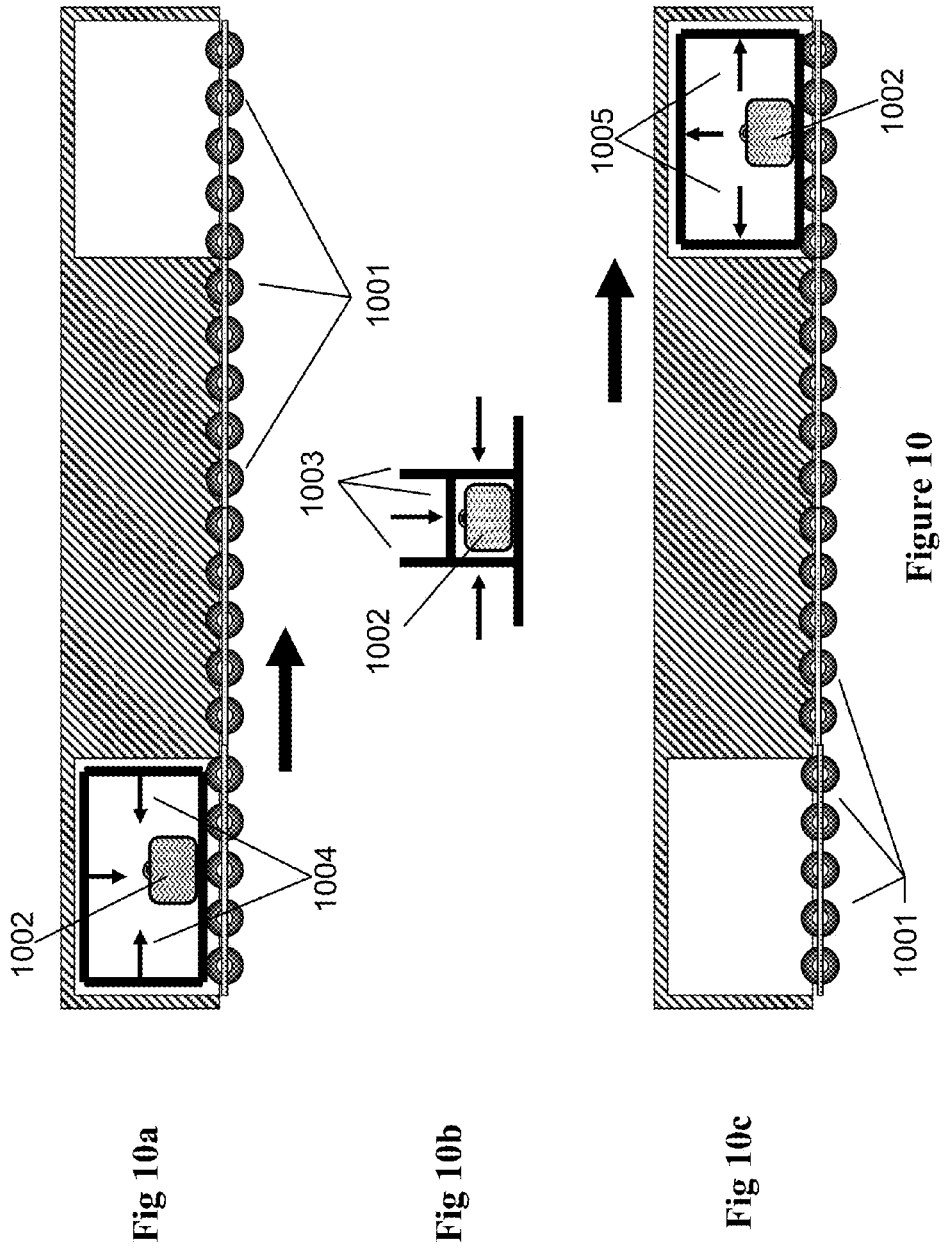
FIG. 10 shows one embodiment of a conveyance system for a robotic baggage portal wherein powered rollers are utilized along with a variable size baggage chamber.

FIG. 10 shows one embodiment of a conveyance system for a robotic baggage portal wherein powered rollers are utilized along with a variable size baggage chamber. FIGS. 10*a* and 10*c* show rollers 1001 used to move a subject's baggage 1002 through the portal. In reality, the conveyance system of FIG. 10 may utilize rollers, a movable tray or compartment, a combination thereof, or any other suitable conveyance system whereby there can exist movable wall(s) 1003 adjacent the subject's baggage. In FIG. 10B movable walls of the baggage compartment are shown as they are moved closer 1004 to the baggage thereby decreasing the amount of airspace surrounding the baggage and concentrating any threatening vapors present on or near the baggage. In order to sense the height of the baggage, a laser, infrared, sonic, or other appropriate sensing system may be used in any movable panels adjacent to the subject's baggage. In FIG. 10C the subject's baggage has been transported through the robotic baggage portal and the walls of the baggage compartment have expanded 1005 to their original positions in order to facilitate retrieval of the baggage by the subject.

Figure 11:
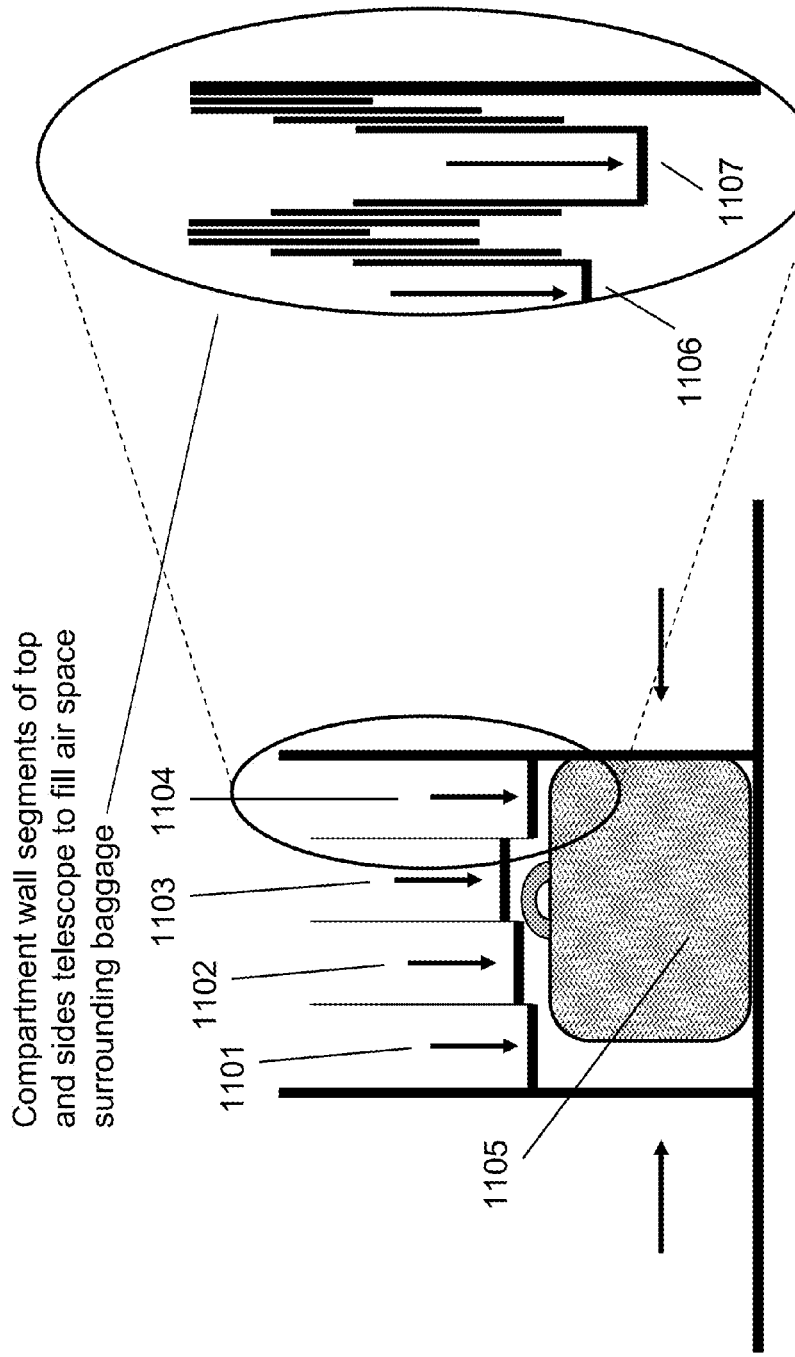
FIG. 11 shows an alternative embodiment for a variable size baggage chamber.

FIG. 11 shows an alternative embodiment for a variable size baggage chamber with movable wall panel mechanisms whereby as shown in FIG. 11*a* the panel above the subject's baggage is segmented and individual segments. For example segments 1101, 1102, 1103, and 1104, are moved separately in order to minimize empty space around the subject's baggage 1105 whereby the volume of the baggage compartment is automatically minimized in order to concentrate threat vapors emitted from the baggage. As shown in FIG. 11*b*, individual moving panels may be implemented for example as telescoping panel segments such as for example segments 1106 and 1107.

FIG. 12 shows an alternate embodiment for a baggage portal which operates in a synchronized manner with a companion human portal. Here, the coordination between the subject and their baggage is accomplished by way of keypad entry of a brief code (like a 4-digit PIN) or some alternative form of quick personal identification verification like a fingerprint, followed by a tracking and coordination operation performed by a controller within, or in communication with, the robotic human and baggage portals. In the exemplary and non-limiting process described in FIG. 12*a*, subject 201 places their baggage 202 into baggage portal 101 and identifies them self to the baggage portal by, for example, entering a short code into Keypad_1 1201. Baggage portal 101 then closes over their baggage thus securing the baggage, and subsequently per FIG. 12*b* subject 201 walks 1202 to the entry of human portal 102 and enters the same code into Keypad_2 1203. They then pass 1204 through human portal 102 per FIG. 12*b* (assuming no threat is detected) and simultaneously their baggage 202 is scanned for threats in the baggage portal. If neither baggage nor human subject are found to represent threats, both pass through the companion portals and in FIG. 12*c* subject 201 walks 204 to the exit opening of baggage portal 101 to retrieve baggage 202. Subject 201 then identifies them self to baggage portal 101 by for example entering the same code into Keypad_3 1205 at the baggage portal exit. Subsequently, the baggage portal opens revealing baggage 202, and subject 201 then retrieves 1206 their baggage. Note that the imaging system for portal synchronization shown in FIG. 2 may be combined with, or substituted in whole or in part, by any combination of a keypad, fingerprint, or any other personal identification mechanism per FIG. 12, to implement synchronization and control of companion baggage and human robotic security portals.

Thus, the foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, unless otherwise specified, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. An automated system for secure area access including synchronized baggage and human security portals, comprising:

an automated human security portal including at least one threat sensor, and is configured to automatically stopping or retaining a subject in response to an automatically detected threat;

an automated baggage security portal including at least one threat sensor, and is configured to automatically stopping or retaining one or more baggage items related to the subject in response to an automatically detected threat among the baggage items;

an electronic control system for automatically controlling and coordinating operation of the human security portal and the baggage security portal;

wherein the baggage items related to the subject are not passed through to a secure area unless the subject is automatically cleared by the human security portal for passage;

wherein the subject is not allowed to pass through the human security portal unless the baggage items related to the subject are automatically cleared by the baggage security portal;

wherein the human and baggage security portals are synchronized to establish and maintain an ownership link or connection between the subject and the baggage items related to the subject;

wherein the automated system operates unattended;

wherein the automated system prevents an unauthorized person from tampering with or taking possession of the baggage items related to the subject;

wherein synchronizing the human and baggage security portals to establish and maintain the ownership link or connection between the subject and baggage items related to the subject is accomplished using a keypad and keycode tracking and coordination mechanism in combination with the electronic control system, wherein:

the subject places at least an item of baggage into the baggage portal and enters a first code into a first keypad to signify ownership, followed by the baggage portal becoming sealed to capture the at least an item of baggage;

the subject moves to the human portal and enters the first code into a second keypad;

after successful screening of both the subject and the at least an item of baggage, the subject moves to the exit of the baggage portal; and the subject enters the first code into a third keypad at the baggage portal exit, the baggage portal opens for access, and the subject retrieves the at least an item of baggage.

2. A computerized method wherein one or more processors automatically control access to a secure area including automatic operation of synchronized baggage and human security portals, comprising:

automatically screening a human subject in an automated human security portal that includes at least one threat sensor and is configured to stopping or retaining the subject when a weapon is automatically detected by the least one threat sensor included in the human security portal;

automatically screening one or more baggage items related to the human subject in an automated baggage security portal that includes at least one threat sensor, said baggage security portal is configured to automatically stopping or retaining the baggage items when a weapon is automatically detected among the baggage items by the least one threat sensor included in the baggage security portal;

passing the baggage items related to the human subject through to a secure area only after the human subject is automatically cleared by the human security portal for passage;

allowing the human subject to pass into the secure area only after the baggage items related to the human subject are automatically cleared by the baggage security portal for passage;

wherein the human and baggage security portals are synchronized to establish and maintain an ownership link or connection between the human subject and the baggage items related to the human subject;

wherein the human and baggage security portals operates unattended wherein the baggage security portal prevents an unauthorized person from tampering with or taking possession of the baggage items related to the human subject;

wherein synchronizing the human and baggage security portals to establish and maintain the ownership link or connection between the human subject and baggage items related to the human subject is accomplished using a keypad and keycode tracking and coordination mechanism in combination with the electronic control system, wherein:

the subject places at least an item of baggage into the baggage portal and enters a first code into a first keypad to signify ownership, followed by the baggage portal becoming sealed to capture the at least an item of baggage;

the subject moves to the human portal and enters the first code into a second keypad;

after successful screening of both the subject and the at least an item of baggage, the subject moves to the exit of the baggage portal; and the subject enters the first code into a third keypad at the baggage portal exit, the baggage portal opens for access by the subject, and the subject retrieves the at least an item of baggage.

\* \* \* \* \*